UNITED STATES PATENT OFFICE 2,245,311

RECOVERY OF SOLUTIZERS

Ellis R. White, Albany, Calif., assignor to Shell Development Company, San Francisco, Calif., a corporation of Delaware No Drawing. Application June 20, 1939,
Serial No. 280,129

9 Claims. (Cl. 260—540)

This invention relates to a method for recovering solutizers from aqueous solutions containing substantial amounts of inorganic metal compounds, and more particularly is directed to the separation of solutizer salts for mercaptans from aqueous caustic alkali solutions, which solutions have become contaminated with inorganic salts.

In the separation of weak organic acids from their solutions in organic substantially water-insoluble liquids such as hydrocarbon liquids by extraction with aqueous solutions of strong bases, e. g., alkali metal hydroxides, the presence of solubility promoters or solutizers for the weak organic acids greatly enhances the efficiency of the extraction. Solutizers have been defined as organic substances which, when in the liquid state, are good solvents for the weak organic acids to be separated, e. g., mercaptans, phenols, etc., are substantially insoluble in the organic water-immiscible liquid, are soluble in the aqueous solution of the strong base, are chemically inert to the action of the strong base even at elevated temperatures of steam stripping, and have boiling temperatures preferably substantially higher than water. Among the several compounds particularly suitable as solutizers for weak organic acids are the following: aliphatic alkanolamines and amino alkylamines in which the alkylene radicles contain 2 to 3 carbon atoms; diamino alcohols, glycols and amino glycols of 3 to 5 carbon atoms; alkyl glycerines in which the number of carbon atoms in the alkyl radical is from 1 to 4; mono alkyl ethers of glycerine in which the alkyl radical has from 1 to 3 carbon atoms; diamino, dihydroxy, or amino hydroxy alkyl ethers, thioethers or imino ethers in which the alkyl radicals have from 2 to 3 carbon atoms; alkali and particularly potassium salts of fatty acids having from 1 to 6 carbon atoms, or of amino or hydroxy fatty acids having from 2 to 7 carbon atoms, or of phenyl acetic or hydroxy or amino phenyl acetic acids, or of dicarboxylic acids having from 5 to 11 carbon atoms in which the carboxyl radicals are separated by at least two carbon atoms, or of phenols or alkyl phenols; mixtures of the above and particularly mixtures with gum inhibitors soluble in aqueous caustic alkali solutions. Outstanding among the above are the salts, because in the regeneration of the spent solution containing absorbed weak organic acids by steam stripping, salts are substantially non-volatile.

The procedure in extracting weak inorganic acids from hydrocarbon distillates or other water-immiscible organic liquids with solutized aqueous solutions of caustic alkalis is quite simple. A sour hydrocarbon distillate for instance, is contacted in an extractor with the aqueous caustic alkali solution containing the solutizer in an effective amount, and the two resulting liquids are then separated. The separated aqueous solution is subjected to a steam stripping to expel absorbed mercaptans, and the stripped solution is returned to the extractor to contact further amounts of sour distillate. The solutizing process and the various solutizers enumerated above have been described in a series of patents, as well as in the general literature, for example, in the Yabroff et al. U. S. Patents 2,149,379, 2,149,380, 2,152,166, 2,152,720, 2,152,723, 2,164,851, 2,186,398, 2,202,039, 2,223,798 and 2,229,995; Refiner and Natural Gasoline Manufacturer, May, 1939, pages 171–176 and March, 1940, pages 73–76, Industrial and Engineering Chemistry, vol. 32, pages 257–262, February, 1940, etc.

It has been found that when operating an extraction system such as the above over long periods of time, inorganic salts, particularly sulfides and carbonates, gradually accumulate in the aqueous alkali metal hydroxide solution, neutralizing an equivalent amount of the alkali metal hydroxide. The sources of sulfide and carbonate may vary. $CO_2$ may be introduced with the steam used for stripping, and $H_2S$ may be contained in the water-immiscible liquid or may be formed by decomposition of mercaptans during the steam stripping. It has been shown that the extraction efficiency for mercaptans and the like increases with the concentration of the alkali metal hydroxide, if the solutizer concentration remains constant, and for this reason, the conversion of the alkali metal hydroxide or a portion thereof to the corresponding carbonate or sulfide greatly diminishes the extraction power of the aqueous solution for the weak organic acids. It is, therefore, desirable to remove the aqueous solution at intervals, and for economical reasons it is very important to recover the solutizers from the discarded solution.

It is the purpose of this invention to recover solutizers from aqueous solutions containing dissolved substantial amounts of inorganic metal compounds such as salts. It is another purpose to achieve this by a solvent extraction method with the aid of a solvent the nature of which will be disclosed hereinafter. Many solutizers are either high boiling or not volatile without decomposition and frequently cannot be recovered by ordinary distillation.

I have discovered that solutizers in general, and more particularly, solutizer salts, can be separated from the inorganic components in the aqueous solutized solution by extracting the latter with an organic solvent which is at least about 25% soluble in water and which, on the other hand, is easily salted out from aqueous solutions by means of inorganic metal compounds, e. g., salts or metal hydroxides.

Another requirement is that the solvent be substantially chemically inert to the inorganic metal compounds, and more particularly, to the alkali metal hydroxide contained in the aqueous solution. Therefore, acidic solvents and solvents which easily hydrolyze or saponify cannot be used in most instances. Certain types of solvents, such as esters, chlorinated solvents, cyanides, etc., which fulfill the solubility requirements but which tend to saponify slowly may sometimes be used if hydrolyzing or saponifying conditions are not very severe. Moreover, the solvent and the solutizer must not react chemically with each other.

Examples of suitable solvents are the normal and isopropyl alcohols, secondary and tertiary butyl alcohols, acetone, diacetone alcohol, diethylene dioxide, tetrahydrofurfuryl alcohol, ethylene, propylene and butylene diamines, ethylene glycol mono methyl to butyl ethers; corresponding thio and imino ethers, pyridine, piperidine, pyrrol, pyrrolidine, morpholine, propyl amines, butyl amines, secondary, tertiary and isoamyl amines, diethylamine, etc.; mixtures of the above or mixtures of any one or several of the above with substantially water-insoluble organic solvents, which mixtures are at least 25% water-soluble. Also mixtures capable of being salted out may be used of any of the above solvents with other solvents which are difficult to salt out and cannot conveniently be used alone for that reason, for example, mixtures of secondary or tertiary butyl alcohol and ethyl alcohol.

Most effective are those solvents which are most readily soluble in water and yet are readily salted out by the inorganic metal compounds contained in the aqueous solutized solution. Thus, even though different solvents may be miscible with water in all proportions, their effectiveness for my purpose may differ considerably. This may be due to the fact that the forces which are responsible for the complete miscibility of the solvents in water are substantially those which cause these solvents to have good solvent powers for the solutizers, and, as is well known, these forces may differ in degree. For example, branched chain alcohols are known to be more soluble in water than normal alcohols of the same number of carbon atoms. While both normal and isopropyl alcohols are miscible with water in all proportions, still the isopropyl alcohol is "more soluble" in water than the normal propyl alcohol. For this reason, in my process the former is the better solvent than the latter. Similarly, isopropyl alcohol is for my purpose a much better solvent than, for example, acetone, even though the latter is miscible with water in all proportions.

Inoperative are solvents such as methyl and ethyl alcohols, ethylene glycol, ethanolamine, etc., because they are so soluble in water that they cannot be salted out conveniently. On the other hand, solvents having solubilities in water less than about 25% normally give poor separation of the solutizers from the inorganic compounds and are frequently inoperative because their solvent action is usually too low for efficient extraction. For example, n-butyl alcohol practically fails to extract fatty acid salts of 3 to 5 carbon atoms from their aqueous solutions.

In this connection, it is of interest to note that certain normally liquid solutizers which have a tendency to be salted out, such as the ethylene and propylene diamines, may be used as "solvents" in the extraction of other solutizers which cannot be salted out, provided the concentration of inorganic metal compounds in the aqueous solution is great enough to cause the salting out of these "solvents."

Examples of solvents which have the solubility requirements but tend to hydrolyze or saponify are ethylene chlorhydrin, methyl cyanide, methyl acetate, etc.

As previously indicated, my process is applicable to the separation of all solutizers, even though solutizers comprise substances of many different groups of chemical compounds. The reason for this universal applicability lies in the fact that solutizers are substances which have common solvent properties, not only toward water, but toward organic water-immiscible compounds and certain organic acids as well, the very definition of solutizers being based entirely on these solubility relations. Hence, different organic solvents which are classed by their common solvent properties toward water have similar solvent properties toward all solutizers independently of their chemical nature which may be widely different. However, it is understood that there are differences in degree regarding the ease with which different solvents extract different solutizers.

The extraction may be carried out by simply mixing the aqueous solutized solution containing inorganic metal compounds with a suitable solvent and allowing the mixture to settle until two layers have separated, which layers are withdrawn separately. Countercurrent methods may instead be employed, if desired. If the solvent is completely miscible with the aqueous solution, the ratio of solvent to aqueous solution may be varied to bring about a phase separation. Or if this fails, more inorganic metal compound may be dissolved in the aqueous solution to salt out the organic solvent; or else the aqueous solution may be concentrated by vaporizing a portion of the water of solution, taking care, however, that, if possible, the concentration is not carried to a point of precipitation of one of the dissolved inorganic metal compounds, since such a precipitate may cause operating difficulties. After separation, the two layers may be distilled separately to recover organic solvent, leaving behind the separated solutizer and inorganic compounds, respectively. Since complete recovery of the organic solvent is an important factor from the point of view of economy, it is desirable that the solvent boil substantially below 200° C. and preferably below 150° C. Vacuum distillation may have to be employed in some instances.

The amount of organic solvent used for the removal of the solutizer usually varies between about 20% to 100% by volume of the aqueous caustic alkali solution, although smaller or larger amounts may be used. The temperature of the treatment may normally be varied between wide limits, but should obviously be below the boiling temperature of the lowest boiling substance present during the treatment, and above the freezing point of the aqueous solution and the organic solvent. Temperatures between about 0° and 60° C. are usually very suitable.

To enable formation of two separate phases when mixing the aqueous solution with a water-miscible solvent, it is necessary that the aqueous solution contain a minimum critical amount of inorganic metal compounds, such as inorganic bases or inorganic salts, to effect salting out of the organic solvent. This minimum critical amount varies with the organic solvent, as well as with the inorganic compound. It may be determined experimentally, if desired. However, knowledge of this minimum amount is rarely required because the formation or lack of formation of two liquid layers is sufficient to show whether or not the required minimum amount is present.

For very efficient separation of the solutizer salt from the inorganic compounds in the aqueous solution, it is highly desirable that the concentration of inorganic compound be far greater than required by the critical minimum. In fact, it is desirable that the total content of inorganic metal compounds in the solution be as high as possible short of complete saturation which may cause formation of undesirable solid precipitate. Therefore, when treating aqueous solutizer solutions which are less than saturated with regard to their inorganic metal compounds, it is advantageous to precede the extraction by a concentrating step even though phase separation may take place without such preliminary step. In some instances, it may even be desirable to carry out the extraction at relatively high temperatures, for example, at 60° to 90° C. so that the concentrating may be pushed further without causing precipitation.

Since in general the aqueous solution of caustic alkali containing solutizer salts is used fairly close to its saturation limits, i. e., normally about 80% to 90% saturated, the amount of water that can be removed safely is quite small, usually less than 10% of the volume of the solution. However, the resulting benefits are usually sufficient to make such a step worth while.

The following examples further illustrate this invention:

*Example I*

An aqueous solution being
3.08 normal with potassium isobutyrate
5.88 normal with KOH
.132 normal with $K_2CO_3$
was treated with 40 volume percent isopropyl alcohol at three different temperatures. In each case, two layers were formed which were separated and analyzed. Results were as follows:

| Temperature, °C. | Volume percent of upper phase | Percent of compounds in upper phase | | |
| --- | --- | --- | --- | --- |
| | | KOH | KIB [1] | $K_2CO_3$ |
| 0 | 72.3 | 62.7 | 98.0 | 52 |
| 20 | 81.3 | 55.7 | 97.9 | 50 |
| 40 | 83.8 | 33.5 | 95.9 | 5.5 |

[1] Potassium isobutyrate.

As will be noted, the separation between the potassium isobutyrate and the inorganic compound increases with increasing temperature.

*Example II*

The influence of dilution or concentration of the aqueous solution on the separation efficiency is illustrated below:

An aqueous solution being
5.51 normal with KOH
2.94 normal with potassium isobutyrate
.118 normal with $K_2CO_3$
was extracted with 40 volume percent isopropyl alcohol at normal room temperature. To a portion of the solution 5% water was added, and from another portion 7.5% water was removed by evaporation. The resulting diluted and concentrated portions were extracted under identical conditions. Results were as follows:

| Concentration | Volume percent of upper phase | Percent of components in upper phase | | |
| --- | --- | --- | --- | --- |
| | | KOH | KIB [1] | $K_2CO_3$ |
| Diluted | 85.5 | 70.0 | 97.0 | 41.7 |
| Normal | 82.8 | 60.7 | 98.3 | 24.2 |
| Concentrated | 79.8 | 54.0 | 97.2 | 1.1 |

[1] Potassium isobutyrate.

*Example III*

Mixtures of acetone and isopropyl alcohol were used to extract the aqueous solution of Example I at 20° C. Two series of tests were made, one in which the ratio of acetone to isopropyl alcohol was varied, and one in which the volume percent of organic solvent to aqueous solution was changed. The large effect which the ratio of organic solvent to aqueous solution has should be noted. This effect is particularly great when using mixed solvents as in this case:

| Volume percent acetone in solvent | Ratio of solvent to aqueous solution | Volume percent of upper phase | Percent of compounds in upper phase | | |
| --- | --- | --- | --- | --- | --- |
| | | | KOH | KIB [1] | $K_2CO_3$ |
| 25 | .4 | 78.4 | 49.0 | 97.7 | 38.0 |
| 50 | .4 | 78.2 | 49.1 | 97.0 | 44.4 |
| 60 | .4 | 79.6 | 53.0 | 96.4 | 58.6 |
| 50 | .4 | 78.2 | 49.1 | 97.0 | 44.4 |
| 50 | .8 | 75.9 | 25.9 | 97.3 | 2.6 |

[1] Potassium isobutyrate.

*Example IV*

A solutized aqueous solution containing 5.88 mols KOH and 3.06 mols potassium isobutyrate was allowed to absorb .914 mols $H_2S$. The resulting solution was then extracted at 20° C. with 40 volume percent of a 30–70 mixture of acetone and isopropyl alcohol. Two layers formed, the upper one being the solvent layer and amounting to 78.9% of the total volume, and the lower aqueous caustic alkali layer being 21.1% by volume. The upper layer contained better than 97% of the potassium isobutyrate and 25.7% of the sulfide, while the lower layer contained less than 3% of the potassium isobutyrate and 74.3% of the sulfide.

It will be noted in the above examples that the upper solvent layer is constantly larger than the lower layer, even though the volume of the solvent is less than that of the aqueous solution. If, instead of a solvent which is at least about 25% water-miscible, a solvent is used which is substantially immiscible with water, such as n-butyl alcohol, the upper layer remains small, usually smaller than the amount of solvent added unless a volume of solvent much greater than the volume of aqueous solution is used, a portion of the solvent being dissolved in the aqueous phase, the solutizer acting as a mutual solvent. In this case, little solutizer is extracted by the solvent, and the desired separation is very unsatisfactory.

By the term "inorganic compounds" as herein used is meant compounds other than those containing both carbon and hydrogen.

I claim as my invention:

1. In a process for separating solutizers for weak organic acids from aqueous solutions containing same and an amount of inorganic metal compounds having salting-out properties, the steps comprising treating said aqueous solution with a solvent selected from the class consisting of normal and isopropyl alcohols, secondary and tertiary butyl alcohols, diacetone alcohol, acetone and tetrahydrofurfuryl alcohol, said amount of said inorganic compound being sufficient under the conditions of the treatment to effect the formation of two liquid layers, an upper solvent layer containing the major portion of said solutizer, and a lower aqueous layer containing inorganic metal compounds, and separating the layers.

2. The process of claim 1 in which the solutizer comprises an alkali metal salt of a fatty acid having from 1 to 6 carbon atoms.

3. The process of claim 1 in which the solutizer comprises potassium isobutyrate.

4. The process of claim 1 in which the inorganic metal compounds comprise an alkali metal hydroxide.

5. The process of claim 1 in which the organic solvent is a mixture of isopropyl alcohol and acetone.

6. The process of claim 1 in which the ratio of solvent to aqueous solution is between .2 and 1.0.

7. In a process for separating solutizers for weak organic acids from an aqueous solution containing the same and amounts of inorganic metal compounds having salting out properties in a concentration less than saturation of any one of the dissolved components, the steps comprising removing a portion of the water of solution to concentrate said solution to a point short of precipitation of any of said inorganic compounds, treating the resulting concentrated solution with a solvent selected from the class consisting of normal and isopropyl alcohols, secondary and tertiary butyl alcohols, diacetone alcohol, acetone and tetrahydrofurfuryl alcohol, the concentration of said inorganic compounds in said concentrated solution being sufficient under the conditions of the treatment to effect the formation of two liquid layers, an upper solvent layer containing the major portion of said solutizer, and a lower aqueous layer containing inorganic metal compounds, and separating the layers.

8. In a process for separating solutizers for weak organic acids from an aqueous solution containing same and amounts of inorganic metal compounds having salting-out properties in a concentration of less than saturation of any one of the dissolved components, the steps comprising dissolving in said solution additional inorganic metal compounds, treating the resulting more concentrated solution with a solvent selected from the class consisting of normal and isopropyl alcohols, secondary and tertiary butyl alcohols, diacetone alcohol, acetone and tetrahydrofurfuryl alcohol, the concentration of said inorganic compounds in said concentrated solution being sufficient under the conditions of the treatment to effect the formation of two liquid layers, an upper solvent layer containing the major portion of said solutizer, and a lower aqueous layer containing inorganic metal compounds. and separating the layers.

9. In a process for separating solutizers for weak organic acids from aqueous solutions containing the same and amounts of inorganic metal compounds having salting-out properties, the steps comprising treating said aqueous solution with a solvent selected from the class consisting of normal and isopropyl alcohols, secondary and tertiary butyl alcohols, diacetone alcohol, acetone and tetrahydrofurfuryl alcohol, said amount of said inorganic compound being sufficient under the conditions of the treatment to effect the formation of two liquid layers, an upper solvent layer containing the major portion of said solutizer, and a lower aqueous layer containing inorganic metal compounds, separating the layers and fractionally distilling the solvent layer to recover both the solvent free from solutizer and the solutizer free from solvent.

ELLIS R. WHITE.